United States Patent [19]

Orengo

[11] Patent Number: 4,482,815

[45] Date of Patent: Nov. 13, 1984

[54] FLOATING BACK-UP POWER SUPPLY

[75] Inventor: Gérard Orengo, Biot, France

[73] Assignee: International Business Machines Corporation, Armonk, N.Y.

[21] Appl. No.: 464,542

[22] Filed: Feb. 7, 1983

[30] Foreign Application Priority Data

Feb. 25, 1982 [EP] European Pat. Off. ........... 82430005

[51] Int. Cl.[3] ........................................ H02J 1/06

[52] U.S. Cl. ........................................ 307/44; 307/64; 307/246; 307/297

[58] Field of Search ..................... 307/44, 64, 66, 246, 307/297, 46

[56] References Cited

U.S. PATENT DOCUMENTS

| | | | |
|---|---|---|---|
| 3,390,307 | 6/1968 | Paddison et al. | 307/66 X |
| 3,646,428 | 2/1972 | Torok | 323/225 |
| 3,753,001 | 8/1973 | Hiroshima et al. | 307/64 X |

FOREIGN PATENT DOCUMENTS

| | | | |
|---|---|---|---|
| 2443528 | 1/1976 | Fed. Rep. of Germany | 307/64 |

OTHER PUBLICATIONS

Electronic Engineering, vol. 50, No. 603, Mar. 1978, "A Differential Power Supply Converter", p. 19.

IBM TDB, vol. 14, No. 1, Jun. 1971, pp. 68-69, "Power Line Disturbance Support Circuit".

*Primary Examiner*—A. D. Pellinen

*Assistant Examiner*—Derek Jennings

*Attorney, Agent, or Firm*—Edward H. Duffield

[57] ABSTRACT

A back-up voltage source useful over a comparatively long time interval during a power outage or voltage fluctuation is described. A circuit for adjusting the position of a voltage difference available at the back-up supply outputs is described. A potential difference appearing at the terminals of a floating voltage source is connected to a reference circuit for generating a voltage reference from the difference of potential. A voltage follower connected to the reference and to a second voltage source is employed to cause the voltage follower to reposition the potential difference of the supply so as to force the voltage reference to a level equal to the second voltage source.

10 Claims, 5 Drawing Figures

FLOATING BACK-UP POWER SUPPLY

TECHNICAL FIELD

This invention concerns a power supply circuit.

TECHNICAL BACKGROUND

The European patent application No. 0 018 517 discloses a diagnosis and alarm device for a line data communications network. When the voltage source of a transmission-reception station in the network happens to fail, a predetermined tone alarm signal is generated and transmitted to a central station, over a line normally used for data transmission. The power necessary for the creating of such an alarm tone and for the transmission thereof, is supplied by a back-up voltage source comprised of previously-charged capacitors. Such a system has a number of constraints. Since the physical bulk of the capacitors is a function of the capacitive values thereof, it is preferred to set the values of the capacitors no higher than necessary. Now, this causes the stored energy to be limited, thereby reducing the time length over which the alarm tone can be generated. The receiver to which the alarm is transmitted, must, therefore, be able to detect the presence of a signal that is not a data signal, and identify it within a period of time comparatively short. Discrimination between an alarm signal and a data signal is made possible by choosing the frequency of the alarm signal so that it is out of the data bandwidth. That is why, in a system wherein the data are transmitted within the 800–2500 Hz frequency range, a 350 Hz sinusoidal alarm signal has been chosen. During the time when the alarm is on, the capacitors are progressively discharged and the lowered voltage which results causes the signal which the device could generate to be distorted and therefore include harmonic frequencies of the 350 Hz tone. Some of these harmonics (1050, 1400, 1750, etc.) would be in the data frequency bandwidth. Now, in transmission networks, several stations are often connected to the central station through the same transmission line. In addition, these stations are geographically more or less remotely positioned with respect to the central station toward which the alarm signal is to be sent. As the sending of the alarm tone is purely at random, the chances that the alarm signal generated by a station appears on the line while data is being sent from another station in the network, are important. Any interference between the data and the alarm, therefore, is a hindrance, more particularly, when the alarm tone is 40 db higher than the data because of the remote locations of the data stations with respect to the central station. It is, therefore, necessary to stop the alarm signal generating procedure before this signal is subject to distortion. This has for an effect shortening of the time imparted to the creation of this signal. In order to make the job of the central station devices used to detect the presence of the alarm signal easier it is desirable that, for a given back-up voltage source, the alarm signal be generated for as long a time interval as possible.

OBJECTS OF THE INVENTION

An object of this invention is to provide for an improved back-up voltage source which can be used within a comparatively long time interval owing to the presence of means for adjusting at will the position of the voltage difference available at the terminals of a floating (not grounded) voltage source, to a given voltage reference.

SUMMARY

More specifically, this invention concerns improved means for positioning at will the difference of potential appearing across the terminals of a floating voltage source, said means being comprised of: reference means for generating a voltage reference from said difference of potential, and voltage follower means connected to said reference means and to a second voltage source, said voltage follower means operating upon the positioning of said difference of potential so as to force said voltage reference to the level of said second voltage source.

This invention will be further disclosed with reference to a preferred embodiment thereof, as illustrated in the accompanying drawings.

DETAILED DESCRIPTION

Figure 1:
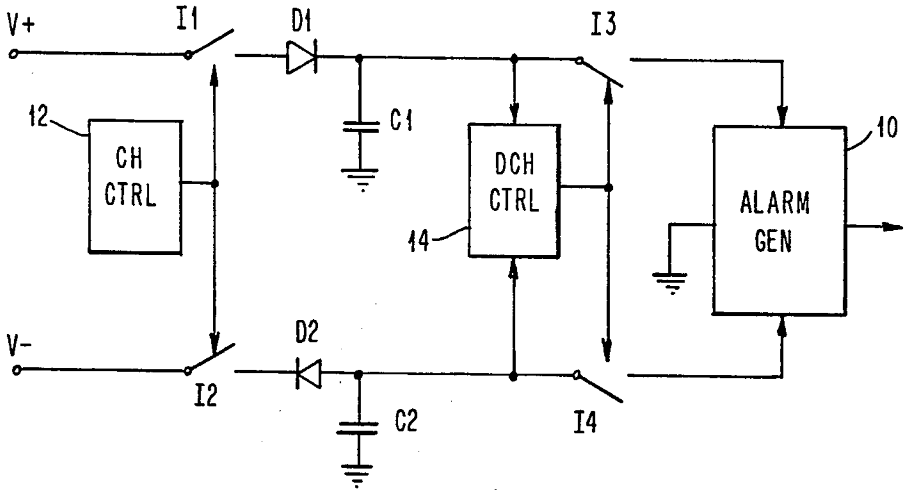
FIG. 1 PRIOR ART
FIG. 1 illustrates a prior art device.

FIG. 1 illustrates a prior art embodiment. Such a device is comprised of two capacitors C1 and C2 adapted to store the back-up power. Capacitor C1 is connected to ground as well as to a positive voltage source V+ through switch I1 and diode D1. Capacitor C2 is connected to ground as well as to a negative voltage source V− through diode D2 and switch I2. Capacitors C1 and C2 are also connected to alarm signal generator 10 (which they will feed when sources V+ and V− are failing), through switching means I3 and I4, respectively. The circuit is also comprised of charge control circuits 12 and discharge control circuits 14. As long as voltage sources V+ and V− are operating, the circuit 12 maintains switches I1 and I2 closed, whereas circuit 14 maintains switches I1 and I2 open. The system is in the so-called charging phase when capacitors C1 and C2 are being charged and the alarm signal generator is at rest. As soon as either of the voltage sources V+ and V− is no more within the acceptable operating limits, a so-called alarm cycle is started. Circuit 12 controls the opening of switches I1 and I2 whereas switches I3 and I4 are closed through a control coming from circuit I4. The device 10 fed by the energy stored by capacitors C1 and C2, then generates a 350-Hz signal, the so-called alarm signal. In the meantime, capacitors C1 and C2 get discharged; the voltages they supply decrease. At some predetermined levels of the voltages supplied by capacitors C1 and C2, the alarm generator 10 produces a distorted signal which, therefore, provides 350 Hz-harmonics. As mentioned above, this should be avoided. It is, therefore, necessary to stop the alarm generator 10 before the generated signal may be distorted. In practice, it happens that some circuits of the alarm generator 10 may need a negative voltage higher than the positive voltage. By way of an example, for a ±2 V peak-to-peak alarm signal, the circuit of the alarm generator 10 would need at least +2.7 and −4.1 V. In that case, the operation of the alarm generator 10 should have to be stopped even earlier than expected, i.e., as soon as magnitude of any of the voltages of capacitors C1 and C2 reach 4.1 V.

Also, any variations in sources $V^+$ and $V^-$ as well as any mismatch of capacitors C1 and C2 should be considered in order to avoid distortions in the alarm signal. In summary, it is therefore useful, after defining the characteristics of the circuit to be fed, to determine carefully the necessary voltages to be supplied from a given voltage source.

Figure 2:
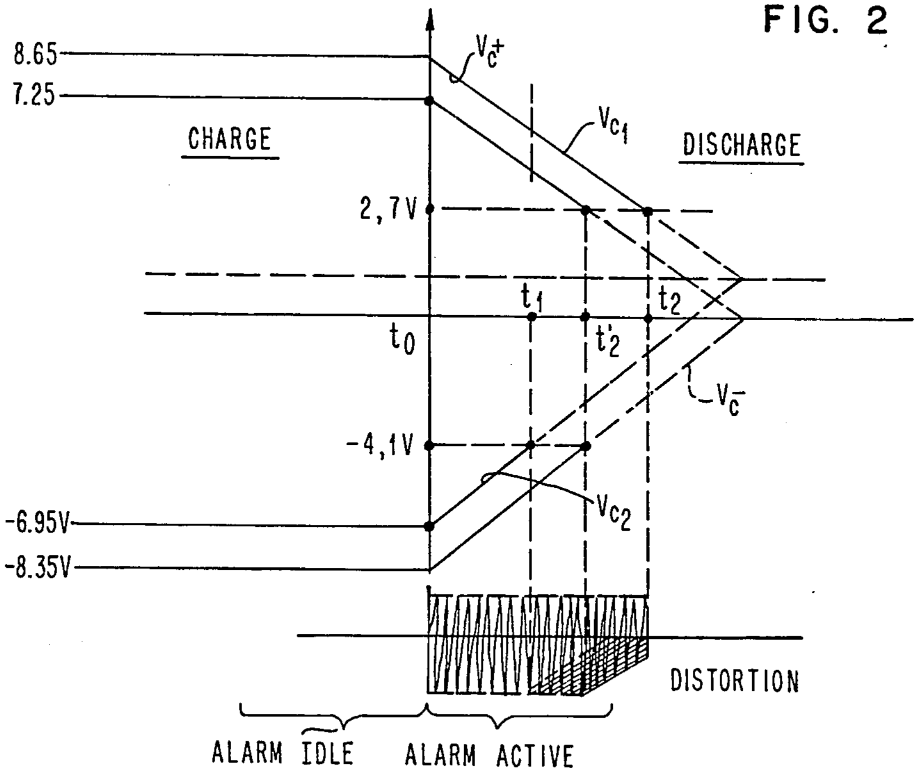
FIG. 2 is a schematic block diagram showing the problems to be solved.

FIG. 2 illustrates a schematic block diagram of a system wherein voltage sources $V^+$ and $V^-$ are ±8.5 V for nominal values at about 10%. In the worst case, $V^+ = +8.5+0.85 = +9.35$ V whereas $V^- = 8.5+0.85 = -7.65$ V.

When taking the voltage drops of about 0.7 V in diodes D1 and D2 into account, C1 and C2 can be charged at 8.65 V and −6.95 V, respectively (see FIG. 2, left of the $t_0$ time reference, alarm generator 10 being idle and capacitors C1 and C2 being charged). Starting the $T_0$ the alarm generator would be operating and C1 and C2 are discharged. The curves VC1 and VC2 illustrate, in a schematic form, symmetrical discharges of capacitors C1 and C2, respectively. It should be mentioned that these discharges are supposed to be constant current discharges in order to make the understanding easier, but the constant current feature should by no means be considered as a requirement. For $|VC2| \leq 4.1$ V, the alarm signal has a distortion caused by a saturation phenomenon visible in the lower portion of FIG. 2, which represents the generated alarm signal. Therefore, from time $t_1$, the alarm circuit cannot be utilized because of these distortions whereas for capacitor C1, the circuit could have been operated until time $t_2$. This situation occurs because of the presence of a double voltage asymmetry, namely, an asymmetry in the charge voltages of C1 and C2 with respect to ground, and an asymmetry in the limit voltages usable for VC1 and VC2.

The circuit of this invention makes it possible to minimize the effect of this double asymmetry by implementing means for centering, or adjusting, at will the discharge zone. With this adjusting procedure it would be possible, more particularly in the case of FIG. 2, to extend the time-length of the non-distorted alarm signal, to $t'_2$. Further on in this disclosure, it will appear that the result can still be improved in comparison with that obtained on FIG. 2.

Figure 3:
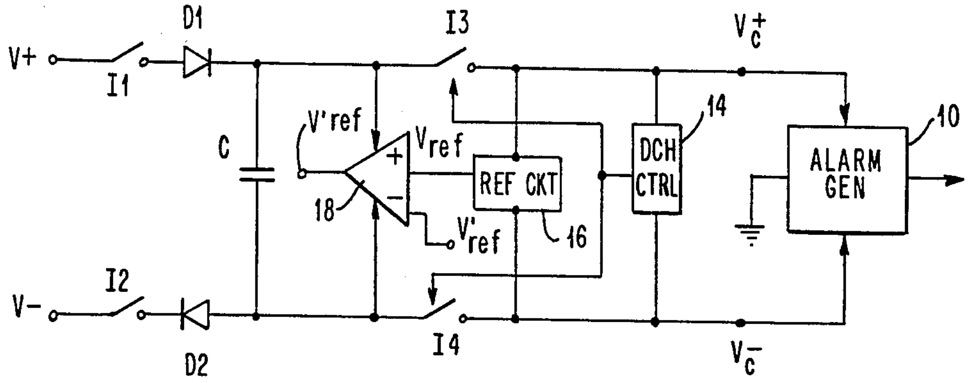
FIG. 3 is the schematic diagram of this invention.

FIG. 3 illustrates a schematic diagram of the device according to this invention. FIGS. 1 and 3 have the same references for designating similar elements. It should be noted that capacitors C1 and C2 have been replaced by a single floating, i.e., not connected to ground capacitor C. It should be noted that any other back-up floating voltage source would operate as well as the floating capacitor. When I1 and I2 are close, i.e., during the charge period, capacitor C is charged to a value:

$$V_c = |V^+| + |V^-| - 2V_d$$

where $V_d$ is representative of the voltage drops across diodes D1 and D2.

During the so-called alarm period, i.e., during the period when the floating voltage source is in operation, I1 and I2 are open whereas I3 and I4 are closed. Two essential elements, however, have been added to the circuit, namely, a reference circuit 16 connected to dowstream switches I3, I4 and a voltage follower circuit 18. The reference circuit 16 generates a first voltage reference $V_{ref}$ more particularly based on the voltages at the terminals of capacitor C. Such a voltage reference $V_{ref}$ is applied to one of the inputs of the voltage follower circuit 18. Circuit 18, which is schematically illustrated here as an operational amplifier, operates so as to force $V_{ref}$ to the level of a second voltage reference $V'_{ref}$ that is a fixed voltage applied to the output and to the other input of said operational amplifier. When, for instance, said voltage $V'_{ref}$ is the ground voltage, the circuit operates so as to force $V_{ref}$ to ground voltage. This causes recentering the difference of potential across capacitor C to ground. This readjusting operation can be continuously controlled.

It has been shown from the description of FIG. 2, that one of the causes of the distortion was the fact that the lowest acceptable voltage threshold (+2.7 V) for VC1 before the occurrence of a distortion in the generated alarm signal, was different in the absolute value from the acceptable voltage threshold (−4.1) for VC2. It is, therefore, of interest to conceive a circuit which, during the discharge period, can shift the discharge function of capacitor C (or of the back-up floating voltage source) toward the negative voltage zone. This is illustrated by curve $V_c^-$ of FIG. 2. This figure illustrates a 1.4 V shift of voltages $V_c^+$ and $V_c^-$ appearing on the electrodes of capacitor C during the discharge period.

Indeed, with a floating voltage source, the circuit of FIG. 3 can provide two voltages $V_c^+$ and $V_c^-$, such that $$|V_c^+| = a[|V_c^-| + b].$$

By way of an example, if, from a floating source $V_c = 9$ V, it is desired to obtain supply voltages $V_c^+ = 3$ V and $V_c^- = -6$ V at the beginning of the utilization or discharge period, $V'_{ref} = 0$ will be chosen and reference circuit 16 will be comprised of a voltage divider including a resistor R series-mounted with a resistor 2R. This leads to a $=(R/2R)=\frac{1}{2}$, $b=0$. Whence, $|V_c^+| = \frac{1}{2}|V_c^-|$. In that case, the ratio between $|V_c^+|$ and $|V_c^-|$ remains constant throughout the discharge operation and the two curves converge to $V'_{ref}$ at the same instant.

$b \neq 0$ can also be used, for instance, $b = -1.2$ V is obtained by placing two diodes in series with resistor 2R. In that case, $$V_c^- = -6.4 \text{ V and } V_c^+ = 2.6 \text{ V}.$$

In the case when $b \neq 0$ not only the voltage across the capacitor is made adjustable with respect to $V'_{ref}$ at the initial discharge instant, but, $V_c^-$ and $V_c^+$ would tend toward $V'_{ref}$ at different instants, or, in other words $V_c^+$ and $V_c^-$ would both converge toward a voltage equal to b/a. This broadens the limits of the improvements provided by this invention.

In other words, with this invention, it is possible, from a floating voltage source, to position at will the voltage (difference of potential) available at the terminals of said source with respect to a given voltage reference. More particularly, with this invention it is possible to position the voltage source with respect to ground.

One of the most important advantages of the circuit according to this invention is that it requires only little additional energy. The only effective additional energy consumption, is that of reference circuit 6. This consumption is minimized in the practice when choosing a reference circuit with a compartively high impedance, in the order of 50K, for instance.

Though a follower stage has been schematically illustrated with a differential amplifier, more simple and integratable circuits fulfilling the same function, can be used.

Figure 4:
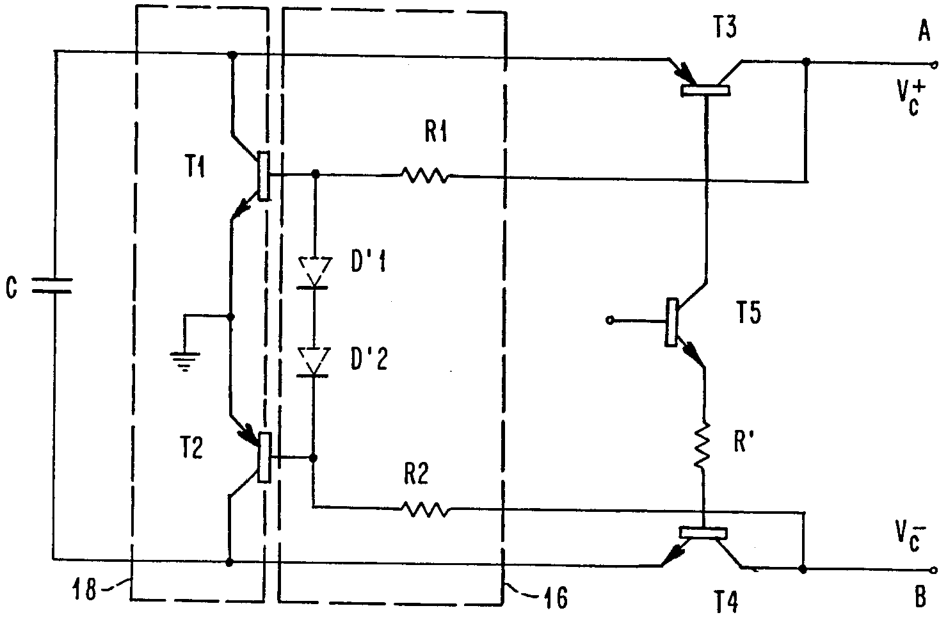
FIGS. 4 and 5 are schematic diagrams for the implementation of this invention.

FIG. 4 illustrates schematically an embodiment of this invention wherein the voltage follower circuit is extremely simple. The reference circuit 16 is, here, a voltage divider including two resistors R1 and R2. The function of voltage follower circuit 18 is obtained, by two series mounted transistors T1 and T2. Transistor T1, of the NPN type, has its collector connected to the capacitor C electrode which is positively charged, and has its emitter connected to ground ($V'_{ref}=0$) and to the emitter of the PNP type transistor T2. The cathode of transistor T2 is connected to the capacitor C electrode which is charged negatively. The common point of resistors R1 and R2 is connected to the bases of transistors T1 and T2. This common point supplies the voltage reference $V_{ref}$. Transistors T3 and T4 fulfill the functions of switches I3 and I4, respectively. Transistor T5 feeding resistor R' fulfills the function of circuit 14 which controls the switches I3 and I4.

During the charging of capacitor C, transistors T3, T4 T5 and non-conducting. It results therefrom that T1 and T2 are also non-conducting.

During the discharging of capacitor C, switches I1 and I2 (not shown) are open while T5 is made conducting. This causes the conducting of transistors T3 and T4 to saturation. The voltage of capacitor C is, then, applied to terminals A and B connected to the load, i.e., to the alarm generator 10 (not shown). The voltage reference $V_{ref}$ appears at the point common to R1 and R2. When $V_{ref}$ is positive, T1 becomes conducting and the centering of the voltage across the capacitor C is readjusted negatively. When $V_{ref}$ is negative T2 becomes conducting and the centering of the voltages across C is readjusted positively. The readjusting is stopped at $V_{ref}=V'_{ref}$ i.e., $V_{ref}=0$ volt. Therefore, the assembly T1, T2 connected to ground, as well as to the point common to R1, R2 supplying $V_{ref}$ acts as a voltage follower tending to force $V_{ref}$ to ground level.

In the practice, the base-emitter voltage drops in the transistors T1 and T2, will be taken into account. The effect of these voltage drops will be compensated by making use of diodes D'1 and D'2, illustrated by a dotted line in FIG. 4.

Figure 5:
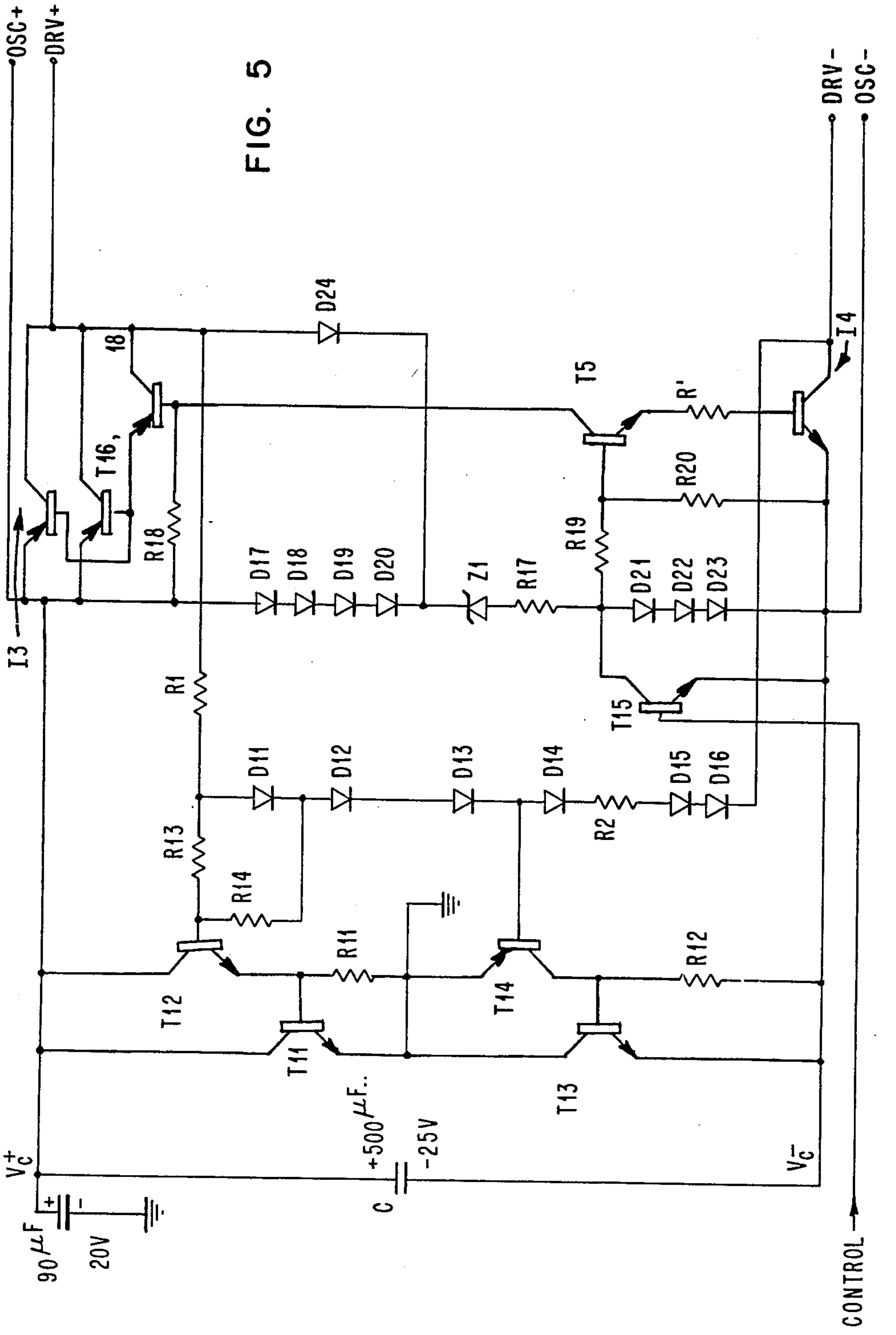

The schematic diagram of FIG. 5 illustrates an embodiment of this invention which makes use of circuit elements similar to those involved in the circuit illustrated in FIG. 4. An input capacitor of 20 μF (20 V) is being used to provide a low impedance to $V_c+-V_c-$ with respect to ground level. The voltage follower assembly T1, T2 has been replace with two Darlington-type circuits, namely (T11, T12, R11) and (T13, T14, R12). The reference circuit 16 includes, in addition to resistors R1 and R2, a series mounted diode assembly (D11, D12, D13, D14, D15 and D16). The base of transistor T12 is connected to the anode of diode D11, through resistor R13, and to the cathode of this same diode, through resistor R14.

The function of switch I3 is fulfilled by a Darlington type circuit including PNP transistors T16, T17 and T18 and resistor R18. Circuit elements T4, T5 and R' are at the same positions as their homologous elements of the device shown in FIG. 4.

Besides, it should be noted that an additional voltage divider being comprised of diodes D17 through D20 series mounted with Zener diode Z1, resistor R17 and diodes D21 through D23, has been placed upstream switches I3 and I4. Diode D24 is mounted between the collector of transistor T18 and the cathode of diode D20. The point common to resistor R17 and to the anode of diode D21 is connected to the base of transistor T5, through a resistor R19. This base of transistor T5 is connected to the emitter of transistor T4, through a resistor R20. Finally, an NPN transistor T15 is connected between the point common to R17 and diode D21 and to the emitter of transistor T4. The control signal for operating the back-up voltage source is applied to the base of transistor T15. It should be noted that the terminals supplying the voltages $V_c+$ and $V_c-$ have been designated by DRV+ and DRV−, in FIG. 5. In addition, two other outputs OSC+ and OSC− have respectively been provided upstream switches I3 and I4.

During the stand-by period, i.e., when the alarm signal is not to be transmitted, a current is fed to the base of inhibition transistor T15. This transistor is saturated and drives the base current of transistor T5. It results therefrom that all the circuits are non-conducting, except for branch D17, D18, D19, D20, Z1, R17 and T15, which branch is used to start the procedure, later on. Since the adjusting circuit is blocked (non-conducting), capacitor C is floating. However, the capacitor C charge circuit (not shown) is active, and the terminals OSC+ and OSC− assume respectively the voltage levels $V_c+$ and $V_c-$ of capacitor C. These voltages are used to feed an oscillator within the alarm generator 10 (not shown), which generates a 350 Hz signal. This signal, however, is not transmitted on to the line because the line driving circuit (not shown) in charge of setting the alarm signal provided by the oscillator to a level sufficient to be transmitted to the line, is not powered-on. This driver circuit is connected to be powered-on by DRV+ and DRV−.

The alarm signal transmitting procedure is started when the base of transistor T5 is no more fed by an external control signal provided by a power failure detection circuit (not shown) which is made to detect that the normal power supply source has failed. In that case, T15 is non-conducting and, since the current is no more derived by T15, it feeds the base of transistor T5. T4, then, is saturated as well as Darlington bridge T16, T17, T18. A voltage is applied to the outputs DRV+ and DRV−, which has for a result several consequences. First, the line driver circuit is fed, i.e., it is ready to send the alarm signal. Also, the centering circuit is set active. Finally, diode D24 becomes conducting and blocks diodes D17 through D20. The control circuit, then, is fed by output DRV+, via D24, Z1, R17, R19 and R20. This circuit, then, is self-sustained. When the voltage between DRV+ and OSC− (which is slightly different from DRV−) is no more sufficient, T5 is blocked, thereby making all the circuit non-conducting. This causes the alarm signal to stop being sent before saturation of the line drive circuit, i.e., before the distortion of the alarm signal.

It is clear that the preceding description has only been given as an unrestrictive example, and that numerous alternatives may be considered without departing from the spirit and scope of this invention.

I claim:

1. A power supply circuit for providing adjustable voltage levels from a floating voltage source, said power supply circuit including:

a reference circuit connected to the terminals of said floating voltage source and generating a first voltage reference;

a second voltage reference source; and a voltage follower circuit connected to said first and second voltage reference sources and to said floating voltage source; said follower circuit adjusting the difference of potential across the terminals of said floating voltage source so that said first and second voltage references are forced to the same voltage level.

2. A power supply circuit according to claim 1, wherein said floating voltage source is comprised of a capacitor previously charged to a predetermined voltage level.

3. A power supply circuit according to claim 1 or 2 wherein said second voltage reference source is fixed.

4. A power supply circuit according to claim 3, wherein said second voltage reference source is ground.

5. A power supply circuit according to claims 1, or 2, wherein said first voltage reference circuit includes a voltage divider connected across the terminals of the floating voltage source.

6. A power supply circuit according to claim 5 wherein said voltage follower circuit is comprised of a differential amplifier.

7. A power supply circuit according to claim 6 wherein that said voltage follower circuit includes:

an NPN transistor the collector of which is connected to one of the terminals of said floating voltage source;

a PNP transistor the collector of which is connected to the other terminal of said floating voltage source;

means for connecting the emitters of said NPN and PNP transistors to said second voltage reference source; and means for connecting the bases of said NPN and PNP transistor to said first voltage reference source.

8. A back-up power supply for feeding a load circuit, said back-up power supply including:

a capacitor;

means for electrically charging said capacitor;

switching means for connecting each of the capacitor terminals to the load circuit;

a voltage divider connected across said capacitor terminals, through said switching means to generate a voltage reference; and a voltage follower circuit connected to the capacitor terminals, said follower circuit being comprised of at least one NPN transistor series-mounted with one PNP transistor, transistors the emitters of which are connected to ground, the bases thereof being connected to said voltage divider.

9. A power supply circuit according to claim 8, wherein said follower circuit is comprised of two Darlington type circuits.

10. A power supply circuit according to claim 8 or 9 wherein said voltage divider is comprised of resistors series-mounted with diodes.

* * * * *